United States Patent [19]
Baba et al.

[11] Patent Number: 5,121,656
[45] Date of Patent: Jun. 16, 1992

[54] SHIFT CONTROL SYSTEM FOR AN AUTOMATIC TRANSMISSION

[75] Inventors: Fumiaki Baba, Higashi-Hiroshima; Masahito Kitada; Shinya Kamada, both of Hiroshima; Koichiro Takeuchi, Hatsukaichi; Takuji Fujiwara; Tatsutoshi Mizobe, both of Hiroshima, all of Japan

[73] Assignee: Mazda Motor Corporation, Hiroshima, Japan

[21] Appl. No.: 750,932

[22] Filed: Aug. 28, 1991

[30] Foreign Application Priority Data

Aug. 28, 1990 [JP] Japan .................................. 2-227813
Sep. 28, 1990 [JP] Japan .................................. 2-261394

[51] Int. Cl.$^5$ ............................................. B60K 17/12
[52] U.S. Cl. .......................................... 74/861; 74/866
[58] Field of Search ......................... 74/860, 861, 866; 364/424.1

[56] References Cited

U.S. PATENT DOCUMENTS

4,222,292  9/1980  Will et al. ............................ 74/866
4,616,531 10/1986  Ogasawara et al. ................. 74/866

Primary Examiner—Richard Lorence
Assistant Examiner—William O. Trousdell
Attorney, Agent, or Firm—Fleit, Jacobson, Cohn, Price, Holman & Stern

[57] ABSTRACT

A shift control system for an automatic transmission including a shift gear mechanism for providing a plurality of shift stages of different speed ratios, a plurality of frictional elements to be selectively actuated for switching a power transmitting path to establish a desired shift stage, range selecting device for selecting a shift range at least between a forward and a reverse ranges through a manual operation of a driver, control device for providing the shift gear mechanism with a specific shift stage in which an input member and output member of the shift gear mechanism are rotated together with each other in the case where the reverse range is selected during a forward movement and thereafter a forward range is selected again, the specific shift stage being provided for a predetermined time period after the forward range is selected again. A double lock condition of the shift gear mechanism can be avoided.

8 Claims, 9 Drawing Sheets

|  | SOLENOID PATTERN | | |
| --- | --- | --- | --- |
|  | (1) | (2) | (3) |
| 1st SOL. VALVE | OFF | OFF | ON |
| 2nd SOL. VALVE | OFF | OFF | OFF |
| 3rd SOL. VALVE | OFF | ON | OFF |

SHIFT CONTROL SYSTEM FOR AN AUTOMATIC TRANSMISSION

BACKGROUND OF THE INVENTION

1. Field of the Invention

The present invention relates to a shift control system for an automatic transmission, specifically to a safe shift control.

2. Description of the Prior Art

Generally, an automatic transmission for an automotive vehicle is provided with a torque converter and a shift gear mechanism of which a plurality of frictional elements, such as a clutch, brake are selectively actuated to switch a power transmitting path to thereby establish a desired shift stage automatically among a plurality of shift stages of different speed ratios.

The automatic transmission is also provided with a hydraulic control circuit for supplying a hydraulic pressure to actuators of the frictional elements selectively to get the desired shift stages.

This kind of automatic transmission is provided with a R-range for reverse movement, a 2-range or S-range, and a 1-range or L-range for fixing or restricting the shift stage obtained therein in addition to a D-range for a forward movement. The automatic transmission is further provided with a N-range for providing a neutral condition, a P-range for parking and the like. A driver operates a shift lever to select a desired shift range within which a shift operation is automatically made for establishing a desired shift stage.

If the driver operates the shift lever to select the R-range by mistake when the vehicle is in a forward movement under for example, the D-range, frictional elements for accomplishing the rear movement in the R-range are engaged so that an engine brake is effected abruptly. As a result, the frictional elements are subjected to excessive load which deteriorates the durability thereof.

As shown in Japanese Patent public disclosure (JP A2) No. 63-13949, there has been proposed that when a shift for the R-range is detected in the case where the vehicle speed is greater than a predetermined value, a solenoid valve is actuated to drain a hydraulic fluid introduced into the frictional elements which is supposed to be engaged in the R-range so that the shift gear mechanism is forced to be neutral.

Generally, the reverse movement can be obtained by engaging two frictional elements (for example, a low reverse brake and reverse clutch). Therefore, in order to prevent the gear mechanism from establishing the reverse movement in the R-range, it is enough to prevent one of the frictional elements from being engaged. If the driver operates the shift lever to select a forward range again thereafter by noticing that he or she had mistakenly operated the shift lever, the other (for example, the reverse clutch) of the frictional elements for the R-range is released to enable to establish a forward range.

When the release of the other frictional element (reverse clutch) is unduly delayed as the driver operates the shift lever to the forward range again, the frictional element for the rear movement and the frictional element for the forward movement may be concurrently engaged temporarily to cause a double lock. As a result, the frictional element for the rear movement (reverse clutch) is dragged to deteriorate the durability.

SUMMARY OF THE INVENTION

It is therefore an object of the present invention to prevent a dragging of frictional element when the shift lever is operated to a forward range after being erroneously operated for the R-range.

It is another object of the present invention to prevent a deterioration of the frictional element for the rear movement.

The above and other object of the present invention can be accomplished by a shift control system for an automatic transmission comprising a shift gear mechanism for providing a plurality of shift stages of different speed ratios, a plurality of frictional elements to be selectively actuated for switching a power transmitting path to establish a desired shift stage, range selecting means for selecting a shift range at least between a forward and a reverse ranges through a manual operation of a driver, control means for providing the shift gear mechanism with a specific shift stage in which an input member and output member of the shift gear mechanism are rotated together with each other in the case where the reverse range is selected during a forward movement and thereafter a forward range is selected again, the specific shift stage being provided for a predetermined time period after the forward range is selected again.

According to another aspect of the invention, the control means restricts engagement of one of two frictional elements which are supposed to be engaged in the reverse range when the range selecting means is operated to select the reverse range during the forward movement. Thereafter, the control means provides the shift gear mechanism with the specific shift stage after the forward range is selected again.

According to the present invention, a specific shift range is established when the reverse range is selected during a forward movement and thereafter a forward range is selected again. As the specific shift stage is established, a frictional element engaged in the reverse range, such as the reverse clutch is still in engaged condition with the input member or the output member of the shift gear mechanism. However, in the specific shift stage, specific frictional elements such as a forward clutch, 3–4 clutch, coast clutch, are engaged so as to rotate the shift gear mechanism integrally. Therefore, even if the release of the reverse clutch is delayed, it does not affect the operation of the shift gear mechanism. In other words, the double lock condition in which two or more frictional elements are concurrently engaged to restrict the movement with each other can be avoided as well as the dragging of the frictional elements. According to another feature of the invention, one of the two frictional elements which are supposed to be engaged in the reverse range is prevented from being engaged when the reverse range is selected during a forward movement so that the shift gear mechanism is kept at a neutral condition until a forward range is selected again, thus the frictional element is not subjected to an undue and excessive load.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
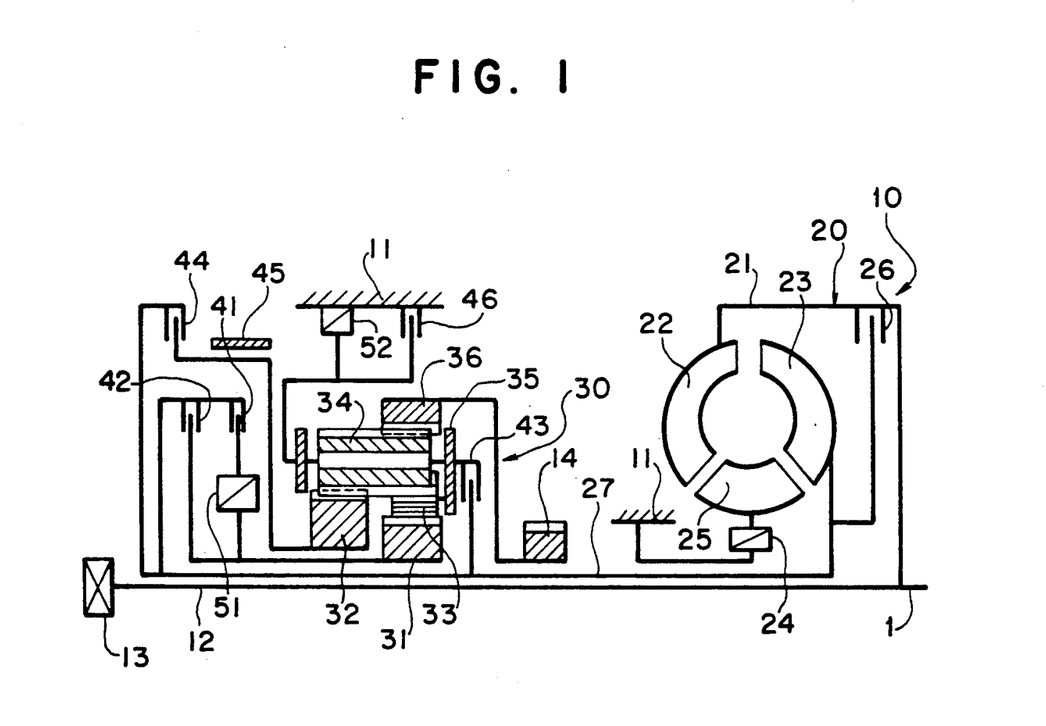
FIG. 1 is a schematic sectional view of an automatic transmission to which a control system in accordance with the present invention can be applied.

Referring to FIG. 1, an automatic transmission 10 according to the present invention includes a torque converter 20, a shift gear mechanism 30 driven by an output of the torque converter 20, a plurality of frictional elements 41–46 and one-way clutches 51 and 52 for switching a power transmitting path of the shift gear mechanism 30 to establish one of D, 2, L, R-range when running. In the D-range, 1–4th shift stages are provided. 1–3rd shift stages are provided in the 2-range. 1–2nd-shift stages are provided in the L-range.

The torque converter 20 includes a pump 22 provided in a case 21 connected with an engine output shaft 1, a turbine 23 facing the pump 22 to be driven by the pump 22 through a hydraulic fluid, a stator 25 disposed between the pump 22 and the turbine 23 and supported by a transmission case 11 through a one-way clutch 24 and a lock-up clutch 26 disposed between the case 21 and the turbine 23 for directly connecting the engaging output shaft 1 with the turbine 23. The rotation of the turbine 23 is transmitted to the shift gear mechanism 30 through the turbine shaft 27. The engine output shaft 1 is connected with a pump shaft 12 passing through the turbine shaft 27. The pump shaft 12 drives an oil pump 13 provided at a rear end portion of the automatic transmission 10.

The shift gear mechanism 30 of a Ravigneaux-type planetary gear mechanism includes a small sun gear 31 movably mounted on the turbine shaft 27, a large sun gear 32 movably mounted on the turbine shaft 27 rearward of the small sun gear 31, a plurality of short pinion gears 33 meshed with the small sun gear 31, a long pinion gear 34 meshed with the short pinion gear 33 at a front portion and with the large sun gear 32, a carrier 35 for rotatably carrying the long pinion gear 34 and the short pinion gear 33, and a ring gear 36 meshed with a front portion of the long pinion gear 34.

Between the turbine shaft 27 and the small sun gear 31 are disposed a forward clutch 41 and a first one-way clutch 51 in series and a coast clutch 42 in a juxtaposed relationship with the clutches 41 and 51. A 3–4 clutch 43 is disposed between the turbine shaft 27 and the carrier 35. A reverse clutch 44 is disposed between the turbine shaft 27 and the large sun gear 32. Between the large sun gear 32 and the reverse clutch 44 is disposed a 2–4 brake 45 as a band brake fixing the large sun gear 32. Between the carrier 35 and the transmission case 11 are disposed a second one-way clutch 52 for supporting the carrier 35 against a reactive force acting thereto and a low reverse brake 46 for fixing the carrier 35 in a juxtaposed arrangement. The ring gear 36 is connected with the output gear 14 through which a rotation is transmitted to right and left wheels (not shown) through a differential mechanism.

A relationship between operations of the frictional elements and the shift stages obtained has been known so that a detailed explanation is omitted by showing the relationship in Table 1. In the table 1, (O) means that the corresponding element is engaged to transmit the torque. (*) means that the corresponding element races when coasting.

TABLE 1

| RANGE | CLUTCH | | | | BRAKE | | ONE-WAY CLUTCH | |
|---|---|---|---|---|---|---|---|---|
| | FORWARD (41) | COAST (42) | 3-4 (43) | REVERSE (44) | 2-4 (45) | LOW REVERSE (46) | 1st (51) | 2nd (52) |
| P | | | | | | | | |
| R | | | | O | | O | | |
| N | | | | | | | | |
| D | | | | | | | | |
| 1st | O | | | | | | O* | O* |
| 2nd | O | | | | O | | O* | |
| 3rd | O | O | O | | | | O* | |
| 4th | O | | O | | O | | | |
| 2 | | | | | | | | |
| 1st | O | | | | | | O* | |
| 2nd | O | O | | | O | | O* | |
| 3rd | O | O | O | | | | O* | |
| 1 | | | | | | | | |
| 1st | O | O | | | | O | O* | O* |
| 2nd | O | O | | | O | | O* | |

Figures 2, 2A:
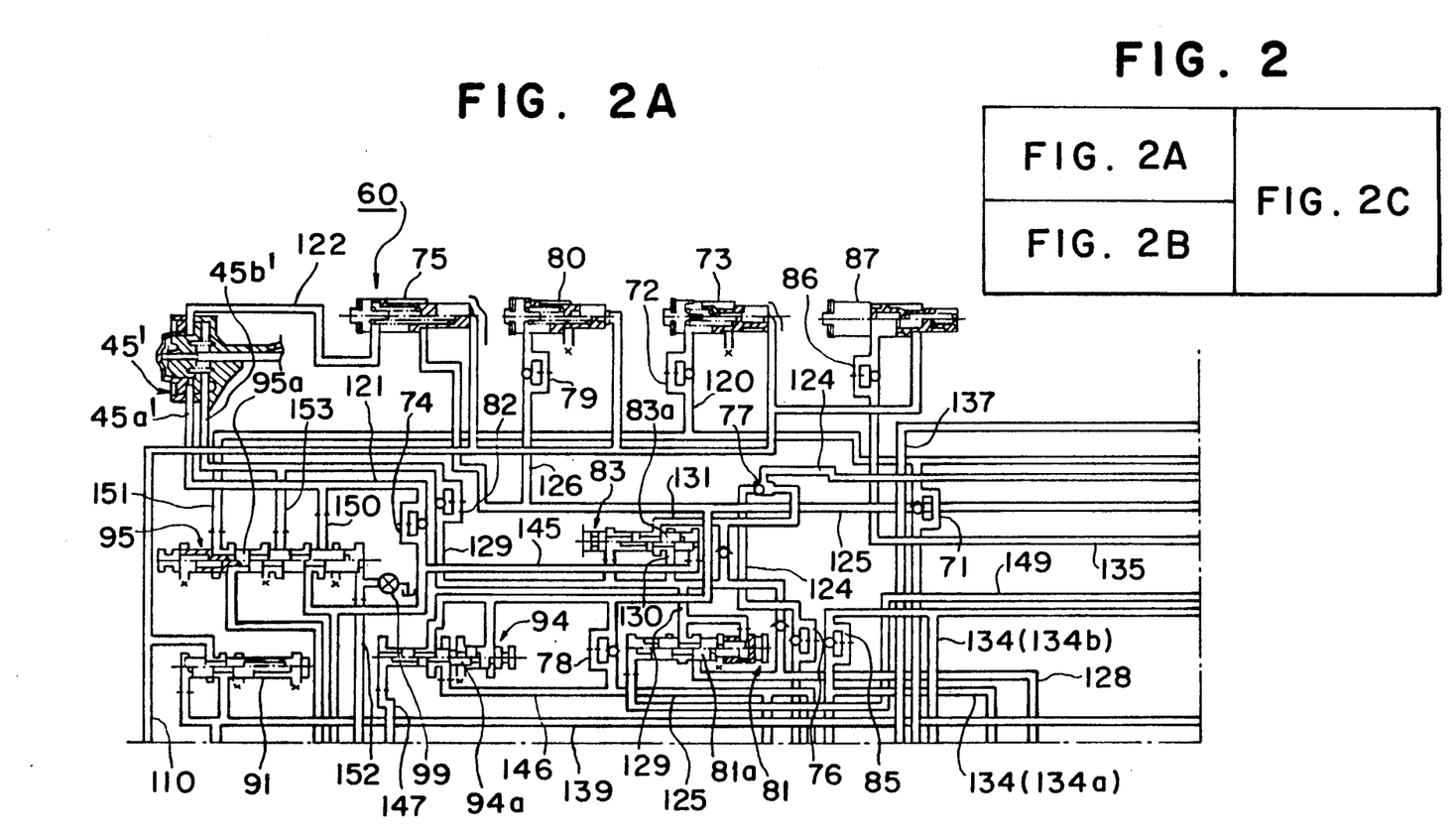
FIGS. 2, 2A, 2B and 2C show a hydraulic control circuit incorporated into the automatic transmission of FIG. 1 for controlling a lock-up clutch.
Figure 2B:
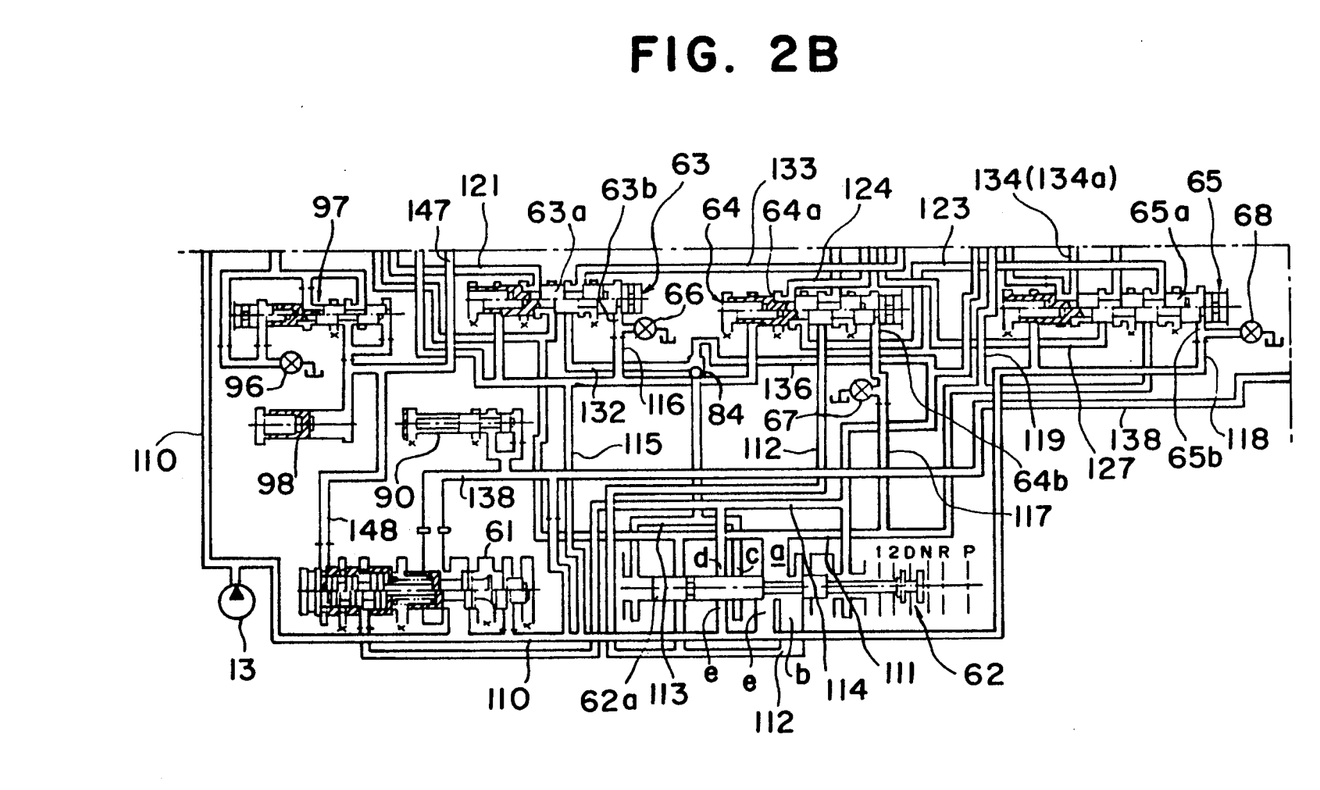
Figure 2C:
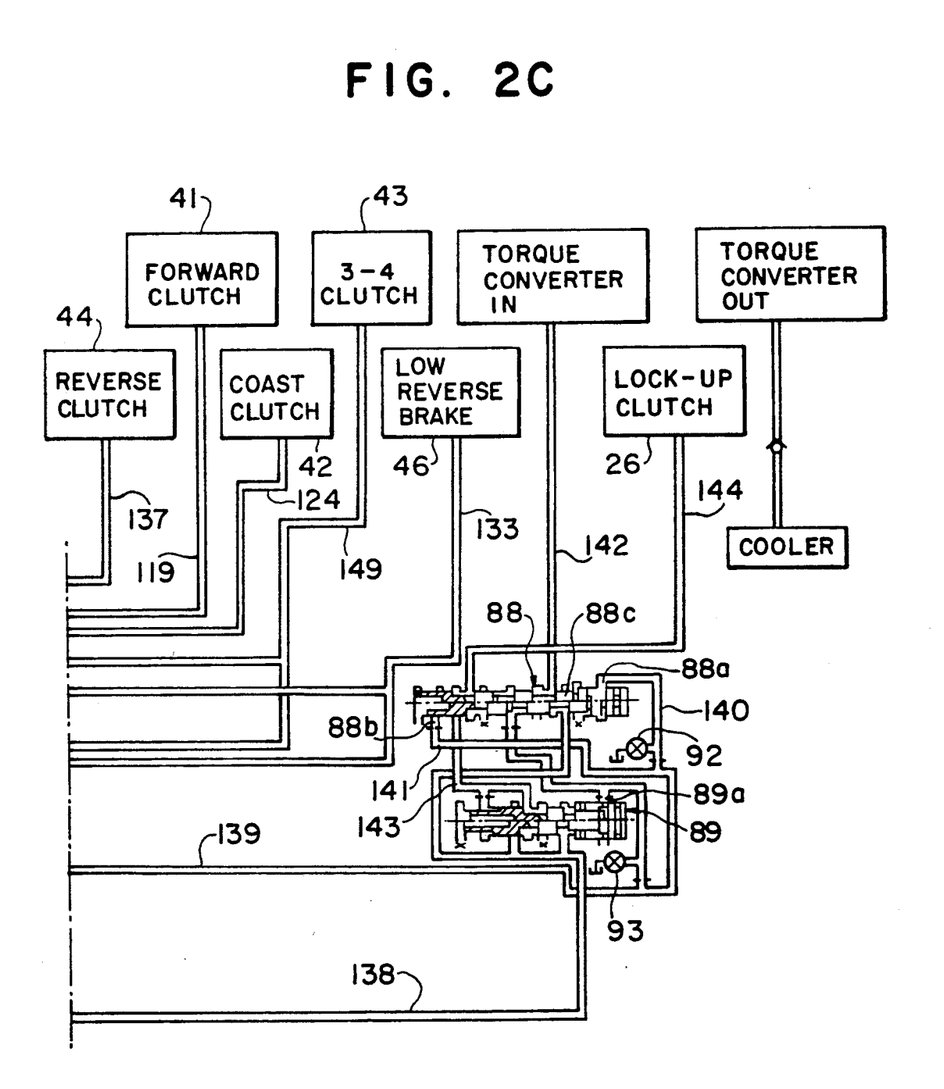

Hereinafter, a hydraulic control circuit 60 is explained taking reference with FIG. 2.

An actuator 45' of the 2–4 brake 45 includes a servo piston having an apply port 45a' and a release port 45b'. When the hydraulic pressure is introduced only into the apply port 45a', the 2–4 brake 45 is engaged. When the hydraulic pressure is supplied to both the port 45a' and the port 45b' or when no hydraulic pressure is supplied to both of them, the 2–4 brake 45 is disengaged. Actuators of the other frictional elements 41–44, and 46 include usual hydraulic pistons so that they are engaged when the hydraulic pressure is introduced into the actuators thereof.

relationship between the ON and OFF of the solenoid valves 66–68 and the shift stages is shown in Table 2.

TABLE 2

|  | D | | | | | 2 | | | 1 | |
| --- | --- | --- | --- | --- | --- | --- | --- | --- | --- | --- |
|  | 1 | 2 | 2→3 | 3 | 4 | 1 | 2 | 3 | 1 | 2 |
| 1st SOLENOID VALVE (66) | OFF | ON | ON | ON | ON | OFF | ON | ON | OFF | ON |
| 2nd SOLENOID VALVE (67) | ON | ON | ON | OFF | OFF | ON | ON | OFF | ON | ON |
| 3rd SOLENOID VALVE (68) | ON | ON | OFF | OFF | ON | ON | OFF | OFF | OFF | OFF |

The hydraulic control circuit 60 is provided with a regulator valve 61 for adjusting a hydraulic pressure from the oil pump 13 to a main line 110 to a line pressure, a manual valve 62 for selecting a range in the D, S(2), L(1) and R through manual operation and 1-2, 2-3 and 3-4 shift valves 63, 64 and 65 which control the hydraulic pressure for the actuators of the frictional elements 41–46.

The manual valve 62 is provided with an input port e and a first through fourth output ports a–d. When a spool 62a is moved, the input port e is communicated with the first and second output ports a, b in the D-range and 2-range, with the first and third ports a, c in the L-range and with the fourth port d in the R-range. With the output ports a–d are connected lines 111–114 respectively.

In the 1-2, 2-3, 3-4 shift valves 63, 64 and 65, spools 63a, 64a and 65a are urged by means of springs (not shown) rightwardly as illustrated. At right end of the spools 63a, 64a and 65a are provided pilot ports 63b, 64b and 65b respectively. With the pilot port 63b of the 1-2 shift valve 63 is connected a first pilot line 116 separated from the main line 110 through a line 115. With the pilot port 64b of the 2-3 shift valve 64 is connected a second pilot line 117 separated from the first output line 111. With the pilot port 65b is connected a third pilot line 118 communicated with the main line 110. On the pilot lines 116, 117 and 118 are provided 1-2, 2-3 and 3-4 solenoid valves 66, 67 and 68. When the solenoid valve 66–68 are energized or ON, the pilot lines 115, 116 and 117 are drained so that the pilot pressure of the ports 63b–65b are discharged. Thus, the spools 63a–65a are placed at the right position. When the solenoid valves 66–68 are deenergized or OFF, the hydraulic pressure is introduced into the pilot ports 63b–65b through the pilot lines 116, 117 and 118 to place the spools 63a–65a at a left position.

Figure 3:
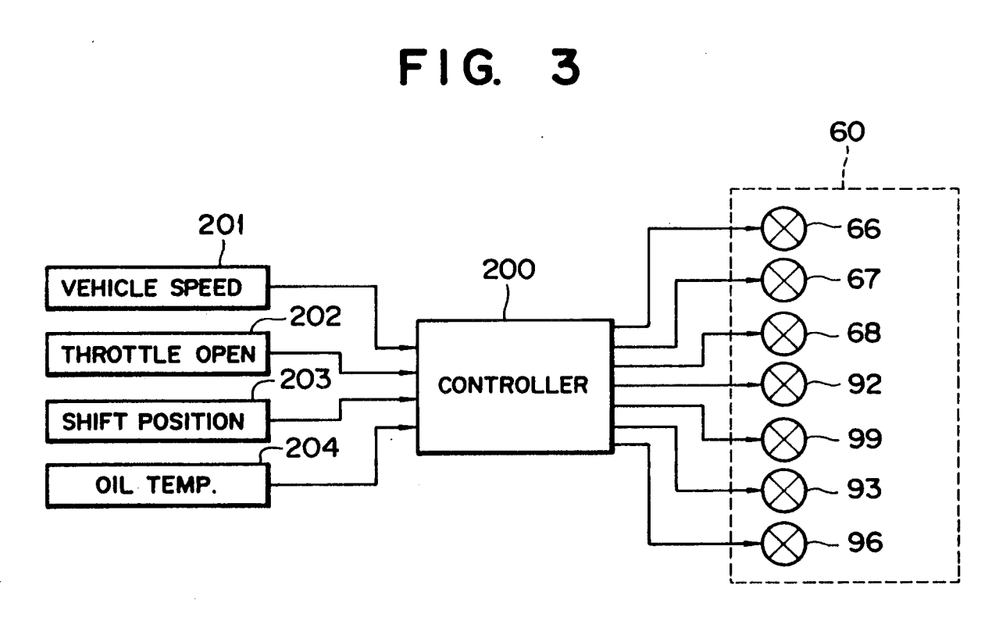
FIG. 3 shows a block diagram of the hydraulic control circuit.

As shown in FIG. 3, a controller is provided for controlling the solenoid valves 66–68, and solenoid valves 92, and 99 and duty solenoid valves 93 and 96. The controller 200 receives signals from a vehicle speed sensor 201 for sensing a vehicle speed, throttle opening sensor 202 for sensing the throttle opening sensor 202 for sensing a throttle opening, shift range sensor 203 for sensing a shift range selected in the shift lever, and an oil temperature sensor 204 for sensing an oil temperature of the automatic transmission.

The controller 200 controls the solenoid valves 66–68 between ON and OFF based on a map defined by the vehicle speed and throttle opening of engine in accordance with a shift range selected by the shift lever (not shown). This causes the switching operation of hydraulic path communicated with the frictional elements 41–46 through the shift of the spool 63a–65a of the shift valves 63–65 so as to change the shift stage in accordance with operating condition. Thus, the frictional element 41–46 are selectively engaged as shown in Table 1 to establish a specific shift stage. In this case, a When a down shift is made from the third to second stages, an intermediate stage is established.

Among the lines 111–114, a forward clutch line 119 is separated from the first output line 111 connected with the main line 110 in forward ranges, D-range, S(2)-range and L(1)-range. The line 119 is connected with a forward clutch 41 through a one-way orifice 71. Thus, in the D, 2 and L-range, the forward clutch 41 is engaged. A N-D accumulator 73 is connected with a line 120 separated from the forward clutch line 119 for providing a damping effect as the forward clutch 41 is engaged.

The first output line 111 is connected with the 1-2 shift valve 63. When the solenoid valve 66 is turned ON to move the spool 63a of the shift valve rightwardly, the line 111 is communicated with a servo apply line 121 so that the hydraulic pressure is introduced to the apply port 45a' of the servo piston 45' through a one-way orifice 74. Thus, when the 1-2 solenoid valve 66 is ON in D, 2 and L-range, in other words, when the second, third or fourth stages is established in the D-range, when the second or third stages is established in the 2-range and when the second stage is established in the L-range, the hydraulic pressure is introduced into the apply port 45a' as a servo apply pressure. In this case, when the hydraulic pressure is not introduced into the release port 45b' wherein the second or fourth stage in the D-range, the second stage in the 2-range or the second stage in the L-range is established, the 2-4 brake is engaged. A 1-2 accumulator 75 for damping in engaging the 2-4 brake 45 is connected with the apply port 45a' through a line 122.

The first output line 111 is communicated with the 3-4 shift valve 65 and with a line 123 when the 3-4 solenoid valve 68 is OFF and the spool 65a is in the left position. The line 123 is communicated with the 2-3 shift valve 64 and with a coast clutch line 124 when the 2-3 solenoid valve 67 is ON and spool 64a is in the right position. The coast clutch line 124 is communicated with the coast clutch 42 through a one-way orifice 76 and a ball valve 77 for switching the hydraulic passage. Thus, when the 2-3 solenoid valve 67 is ON and the 3-4 solenoid valve 68 is OFF, in other words when the second stage in the 2-range and the first or second stages in the L-range are established, the coast clutch 42 is engaged.

The second output line 112 communicated with the main line 110 in the D, 2 and L-ranges is communicated with the 2-3 shift valve 64. When the second solenoid valve 67 is OFF so that the 2-3 shift valve is located at the left position, the line 112 is communicated with a 3-4 clutch line 125. The 3-4 clutch line 125 is communicated with the 3-4 clutch 43 through a one-way orifice 78. Therefore, when the second solenoid valve 67 is OFF in the D and 2-ranges, or when the third and fourth stages in the D-range, or third stage in the S-range is established, the 3-4 clutch 43 is engaged. A line 126 divided from the 3-4 clutch line 125 is connected through a one-way orifice 79 with an accumulator 80 for providing a damping effect as the 3-4 clutch 43 is engaged.

A line 127 divided from the 3-4 clutch line 125 is communicated with the 3-4 shift valve 65. When the third solenoid valve 68 is OFF so that the spool 65a of the shift valve 65 is located at the left position, the line 127 is communicated with the line 128 and with a servo release line 129 through a 2-3 timing valve.

The line 129 is communicated with the release port 45b, of the servo piston 45, through a one-way orifice 82. When both the second and third solenoid valve 67 and 68 are OFF, or when the third stage in the D-range or the 2-range, the servo release pressure is introduced into the release port 45b' of the servo piston 45' to release the 2-4 brake 45.

A line 130 divided from the servo release line 129 is communicated with the coast clutch line 124 through a coast timing valve 83, a line 131 and the ball valve 77 and thereafter with the coast clutch 42.

The third output line 113 communicated with the main line 110 in the L-range by means of the manual valve 62 is communicated with the 1-2 shift valve 63 through a ball valve 84 which functions as a switching valve and a line 132. When the first solenoid valve 66 is OFF so that the spool 63a of the 1-2 shift valve 63 is located at the left position, the line 132 is communicated with the a low reverse brake line 133 and with the low reverse brake 46 through a one-way orifice 85. Thus, when the first solenoid valve 66 is OFF in the L-range, or when the first stage is established in the L-range, the low reverse brake 46 is engaged.

A bypass passage 134 is provided on the low reverse brake line 133 for bypassing the one-way orifice 85. The bypass passage 134 includes a first bypass passage 134a separated from an upstream portion of the one-way 85 of the line 133 and communicated with the 3-4 shift valve 65, and a second bypass passage 134b extended from the 3-4 shift valve 65 to a downstream portion of the one-way orifice 85. When the 3-4 solenoid valve 68 is OFF so that the spool 65a is located at the left position, the first and second bypass passage 134a and 134b are communicated with each other.

A line 135 divided from the low reverse brake line 133 is connected with an accumulator 87 for providing a damping effect when the low reverse brake is engaged.

The fourth output line 114 communicated with the main line 110 in the R-range is communicated with the 1-2 shift valve 63 through a line divided from the line 114, the ball valve 83 and the line 132. Further, the fourth output line 114 is communicated with the reverse clutch 44 through a reverse clutch line 137. Thus, in the R-range, when the 1-2 solenoid 66 is OFF, the low reverse brake 46 is engaged. The reverse clutch is kept engaged in the R-range.

The hydraulic control unit 60 is also provided with a lock-up shift valve 88 for actuating the lock-up clutch 26 of the torque converter 20 shown in FIG. 1 and a lock-up control valve 89 for adjusting the hydraulic pressure introduced into the torque converter 20.

The lock-up shift valve 88 is connected with the regulator valve 61 and a relief valve 90 through a torque converter line 138. A first and second pilot ports 88b and 88c provided at opposite ends of the valve 88 are communicated with lines 140 and 141 separated from a pilot line 139 which is separated from the main line 110 and provided with a solenoid reducing valve 91. The fourth solenoid valve 92 for lock-up is provided on the line 140. When the lock-up solenoid valve 92 is ON so that the spool 88c of the lock-up shift valve 88 is located at the right position, the torque converter line 138 is communicated with a torque converter line 142 and with the inside of the torque converter 20 so that the hydraulic pressure in the torque converter 20 is increased to engage the lock-up clutch 26. When the lock-up solenoid valve 92 is OFF so that the spool 88c of the valve 88 is moved leftward, the converter line 138 is communicated with a lock-up release line 144 through the lock-up control valve 89 and the line 143 so that a lock-up release pressure is introduced into the torque converter 20 to release the lock-up clutch 26.

In this case, the pilot pressure introduced into the pilot port 89a of the lock-up control valve 89 is adjusted by means of the first duty solenoid valve 93 so that the lock-up release pressure is controlled to accomplish a full release condition or a slip condition having a predetermined slip rate of the lock-up clutch 26.

In addition, the hydraulic control circuit 60 is provided with a bypass valve 94 and a 3-2 timing valve 95 in addition to the coast timing valve 83 and the 2-3 timing valve 81.

The coast timing valve 83 is disposed between the line 130 separated from the servo release line 129 and the line 131 communicated with the coast clutch line 124 through the ball valve 77. The servo apply pressure is introduced to one end of the spool 83a through a line 145 separated from the servo apply line 121. When the servo release pressure introduced into the other end of the spool 83a through the line 129 added to a spring force is increased beyond the servo apply pressure, the spool 83a is moved to communicate the line 130 with the line 131. Therefore, when a shift up operation from the second to the third stages (a 2-3 shift-up operation) is made in the D or 2 range wherein a coast clutch pressure is introduced into the coast clutch 42 through the lines 130 and 131, the coast clutch 42 is engaged after the servo release pressure is increased enough to release the 2-4 brake 45. As a result, a double lock condition can be avoided that both the 2-4 brake 45 and the coast clutch 42 are engaged concurrently. In this case, the servo apply pressure is introduced into one end of the spool 83a so that the communication timing between the lines 130 and 131 is changed in accordance with the servo apply pressure. As a result, a relationship between the communication timing and the pressure level of the servo release can be maintained appropriately.

The bypass valve 94 is provided on a bypass line 146 which bypasses the one-way orifice 78 provided on the 3-4 clutch line 125. A spool 94a of the valve 94 is subjected to a 3-4 clutch pressure produced at downstream of the one-way orifice 78 at one end, and subjected to a throttle modulator pressure at the other end. The throttle modulator pressure corresponding to the engine load is produced by means of the second duty solenoid valve 96 and introduced to the other end of the spool 94a through a line 147 and a throttle modulator valve 97 which provides the regulator valve 61 with the modulator pressure. When the 3-4 clutch pressure is increased beyond a predetermined value to move the spool 94a to the left position, the bypass line 146 is interrupted. At the beginning, the 3-4 clutch pressure is increased quickly by the hydraulic pressure introduced through the bypass line 146. Thereafter, the 3-4 clutch pressure is increased gradually by means of the one-way orifice 78. As a result, the engaging timing of the 3–4 clutch 43 can be controlled in the 2–3 shift up operation. This timing is controlled in accordance with the throttle opening. An accumulator 98 is provided on a line 148 for providing a damping effect when the throttle modulator pressure is introduced into the regulator valve 61.

The 2–3 timing valve 81 is provided between the servo release line 129 and a line 128 communicated with the 3–4 shift valve 65. A spool 81a of the valve 81 is subjected to the 3–4 clutch pressure of the 3–4 clutch line 125 at one end through a line 149 and to the servo release pressure at the other end. The valve 81 communicates the servo release line 129 with the line 128 and drains the line 129 in accordance with the servo release pressure so that the servo release pressure is controlled in response to the 3–4 clutch pressure.

The 3–2 timing valve 95 is provided between a first bypass line 150 bypassing the one-way orifice 74 on the servo apply line 121 and a second bypass line 151 bypassing the one-way orifice 71 on the forward clutch line 119. The valve 95 is communicated with a pilot line 152 separated from a line 115 communicated with the main line 110 at one end portion of a spool 95a, communicated with a drain line 153 separated from the servo release line 129 at an intermediate portion of the spool 95a. The pilot line 152 is provided with a fifth solenoid valve 99.

The timing valve 95 opens and closes the first and second bypass lines 150 and 151 by means of the fifth solenoid valve 99 in a 1–2 shift up operation (shift up operation from the first stage to the second stage), the 3–2 shift down operation and a 4'42 shift down operation (shift down operation from the fourth stage to the second stage) so as to control hydraulic supply timing. In detail, the valve 95 is operated to communicate the first bypass line 150 so as to provide the apply port 45a' with the servo apply pressure increasing rapidly in an initial stage of the 1–2 shift up operation. After a certain time period from the start of the shift operation, the first bypass line 150 is interrupted so that the servo apply pressure increasing gradually is introduced into the apply port 45a' of the servo piston 45' through the one-way orifice 74. In the 3–2 shift down operation, the valve 95 communicates the drain line 153 with a drain port and thereafter interrupts the drain line 153. As a result, the servo release pressure is decreased quickly at initial stage of the shift operation through the drain line 146 and decreased gradually at final stage of the shift operation through the one-way orifice 82 which reduces a flow area of the servo release line 128.

In the 4–2 shift down operation, the valve 95 opens the second bypass line 151 at initial stage so that the forward clutch pressure increasing rapidly is introduced into the forward clutch 41. At final stage of the shift operation, the second bypass line 151 is closed so that the forward clutch pressure increasing gradually by virtue of the one-way orifice is introduced into the forward clutch 41.

Figure 4:
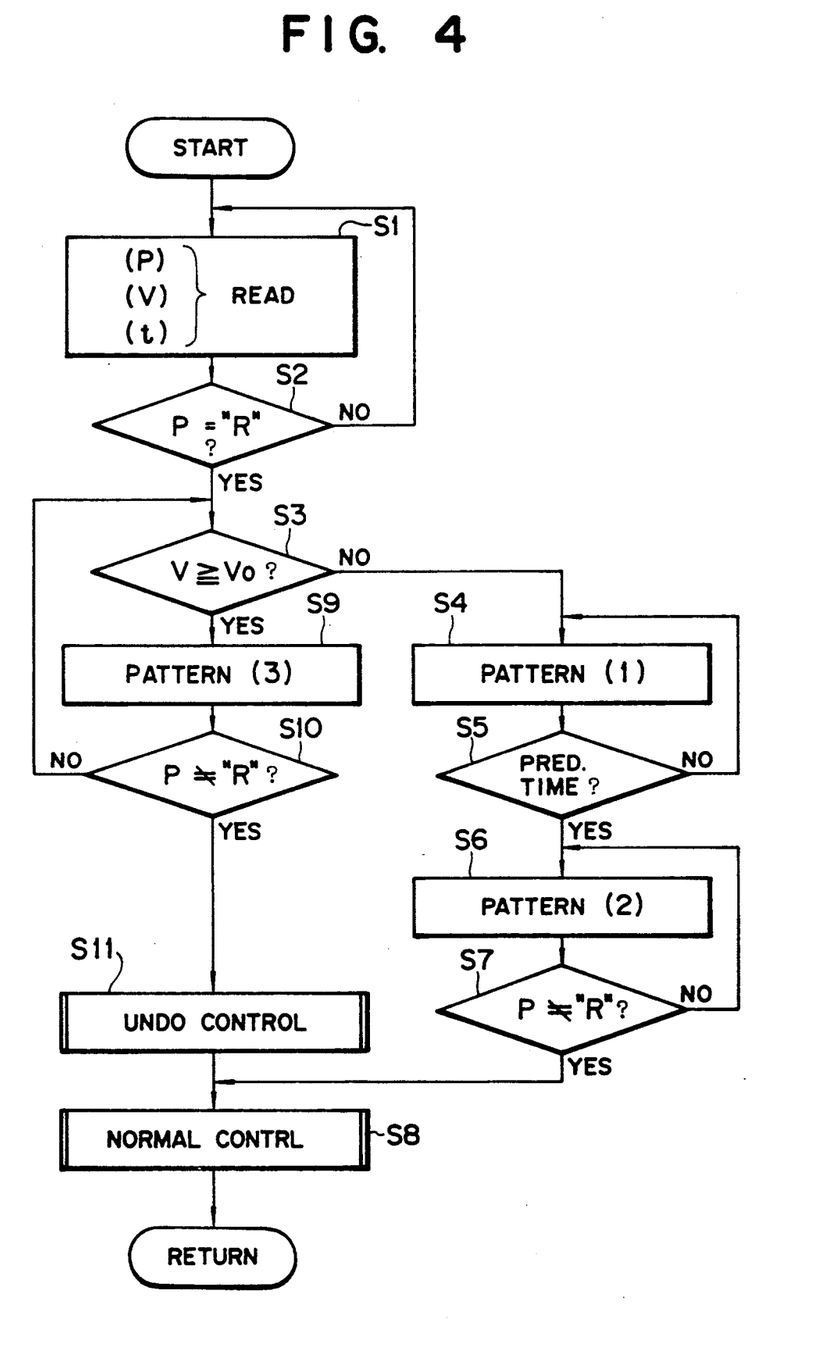
FIG. 4 is a flow chart of a control when the shift lever is erroneously operated to R-range.

As shown in FIG. 4 in the form of a flow chart, the controller 200 reads a shift range position P, vehicle speed V and oil temperature t through respective sensors (S1). In step S2, the controller 200 judges whether or not the shift range position P is "R". If the shift lever is operated to change the shift range position P to "R", thus P=R, the judgment is made as to whether or not the vehicle speed V is greater than a predetermined value $V_0$. The value of $V_0$ takes a positive one when the vehicle moves forward. Therefore, if the vehicle speed V takes a negative value, the controller 200 carries out a control for a reverse movement in accordance with steps S4-S8.

In this control, the manual valve is shifted to the R-range so that the main line 110 is communicated with the fourth output port d. As a result, the line pressure is controlled to the reverse clutch pressure and is introduced into the reverse clutch 44 to be engaged.

Figure 5:
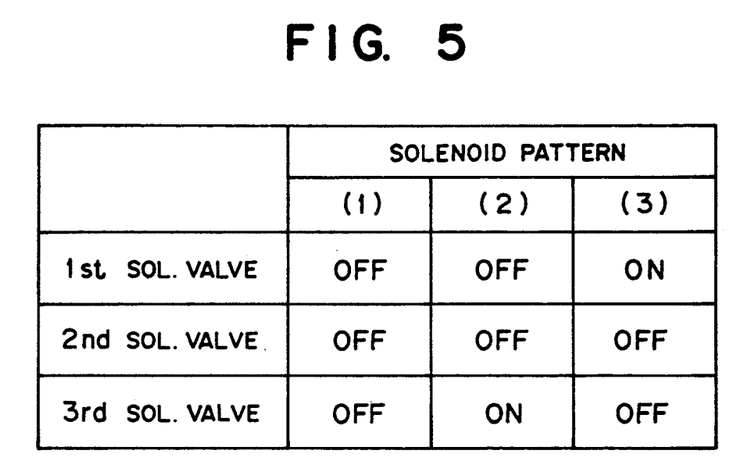
FIG. 5 is a diagram of solenoid pattern employed in the control in accordance with the present invention.
Figure 6:
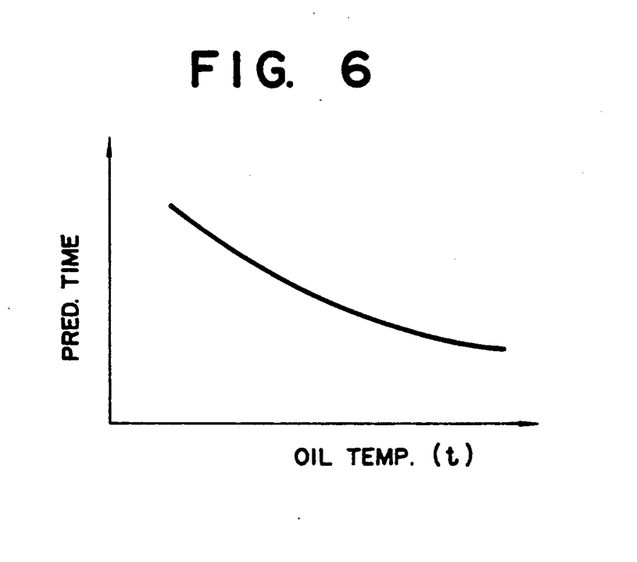
FIG. 6 a graphical representation showing a relationship between the oil temperature and a predetermined time period set in the control.

The controller 200 uses a pattern (1) shown in FIG. 5 as a combination of operation of first - third solenoid valves 66–68 for making the shift operations. In the pattern (1), the spools 63a, 64a and 65a of the 1–2 shift valve 63, 2–3 shift valve 64 and 3–4 shift valve 65 are located at the left positions respectively. The hydraulic pressure from the fourth output port d is introduced into the 1–2 shift valve 63 through the line 114, 136 and 132 and thereafter to the low reverse brake 46 through the low reverse brake line 133 provided with the one-way orifice 85 as a low reverse brake pressure. In this case, the first and second bypass lines 134a and 134b of the bypass line are communicated with each other through the 3–4 shift valve 65 so that the low reverse brake pressure is introduced into the low reverse brake 46 through the bypass line 134.

The controller 200 holds the pattern (1) until a predetermined time period has passed in step S5. After the predetermined time period, the controller 200 switches the pattern (1) to pattern (2) in FIG. 5. In the pattern (2), the solenoid valve 68 is turned on so that the spool 65a of the 3–4 shift valve 65 is moved toward right to thereby interrupt the communication of the first and second lines 134a and 134b. As a result, the low reverse brake pressure is introduced into the low reverse brake 46.

In detail, the low reverse brake pressure is quickly increased in the initial stage of the shift operation to the reverse stage so that a hydraulic pressure accumulated in the N-R accumulator 87 is quickly accomplished. After the predetermined time, the low reverse brake pressure is increased gradually so that the engaging shock is obviated because of the gradual introduction of the hydraulic fluid in addition to action of the accumulator 87. In this case, the predetermined time period is increased as the oil temperature is decreased or the viscosity of the oil is increased. Thus, the quick formation of the accumulated pressure of the accumulator 87 can be ensured.

Thereafter, when the shift range position P is changed from the R-range to another, the controller 200 carries out steps S7 and S8 as a normal solenoid control.

When the vehicle speed is greater than the predetermined value $V_0$ in the case where the shift range P is the R-range (P=R), in other words, when the shift lever is erroneously shifted to the R-range, the controller carries out step S9 and set a pattern (3) shown in FIG. 5. In this pattern (3), the first solenoid valve 66 is turned ON so that the spool 63a of the 1–2 shift valve 63 is moved to the right position. As a result, the low reverse brake line 133 is drained. Therefore, even the manual valve operated to take the R-range, the engagement of the low reverse brake 46 is prevented although the reverse clutch 44 is engaged. Consequently, when the shift lever is operated erroneously to the R-range, the shift gear mechanism 30 is changed to a neutral condition in which no driving force is transmitted through the shift gear mechanism 30 so as to prevent an overload from acting on the reverse clutch 44 and the low reverse brake 46.

Thereafter, if the driver notices the operation mistake and operates the shift lever to a forward range again, the controller 200 carries out a control for undoing the operation mistake in step S11.

Figure 7:
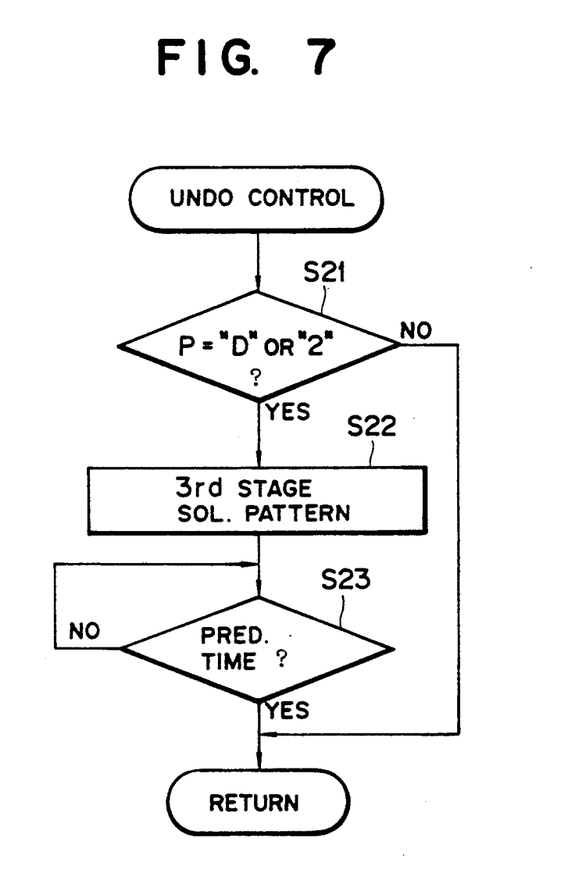
FIG. 7 is a flow chart of a subroutine program for a shift control for a forward movement.

This control is executed in accordance with a flow chart shown in FIG. 7. The controller 200 judges whether or not the shift range is no longer in the R-range in step S10. Thereafter, the controller detects which range is selected again in step S21 of FIG. 7. If the shift range P is the D or 2-range, the controller 200 uses the solenoid pattern in Table 2 for the third stage in the D or 2-range. The controller 200 holds the pattern until it is judged that a predetermined time period has passed in step S23.

Figure 8:
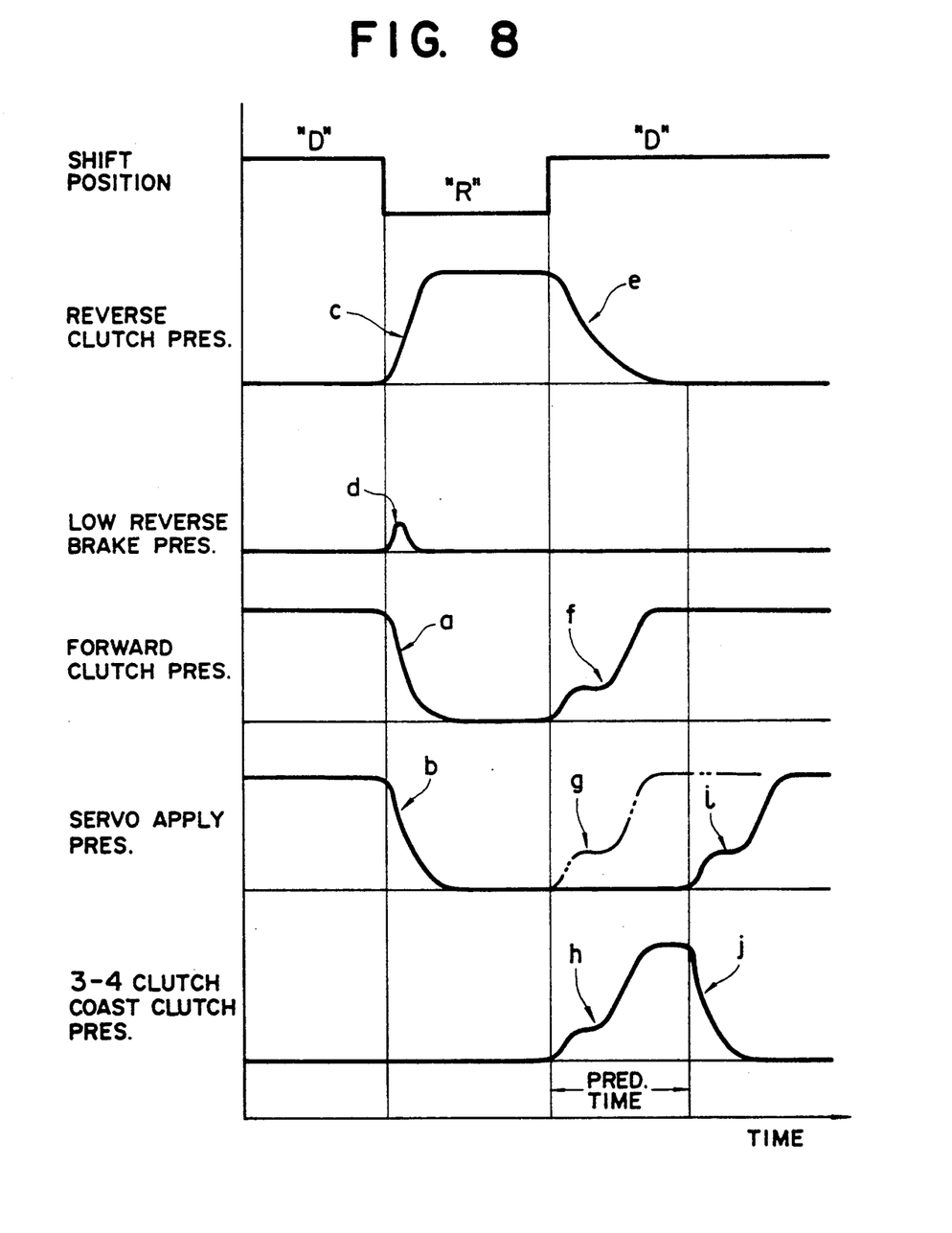
FIG. 8 is a time chart showing a change in the hydraulic pressure.

Referring to FIG. 8, there are shown a change in a hydraulic pressure to and from the frictional elements and operation thereof. Assume that the shift stage was the second stage in the D-range before the shift lever is shifted to the R-range. Because of the erroneous operation, the forward clutch pressure and the servo apply pressure are discharged to release the forward clutch 41 and the 2-4 clutch 45 as shown by reference a and b. Concurrently, the reverse clutch pressure is introduced to the reverse clutch 44 to engage it as shown reference c. In this case, the introduction of the low reverse brake pressure for the low reverse brake 46 and thus the engagement of the low reverse brake 46 is prevented as shown by reference d so that the neutral condition of the shift gear mechanism is established as aforementioned.

Then, if the shift range P is changed to the D-range again, the reverse clutch pressure is drained so that the reverse clutch 44 is released as shown by reference e. In this case, the solenoid pattern is established for the third stage so that the forward clutch pressure, the 3-4 clutch pressure and the coast clutch pressure are introduced into the forward clutch 41, 3-4 clutch 43 and coast clutch 42 to be engaged as shown by references f and g to thereby establish the third stage. In the initial stage of the shift operation to the third stage, the reverse clutch pressure is not fully discharged as shown by the reference e and thus the reverse clutch 44 is not fully released. In other words, the engagement of the reverse clutch 44, the forward clutch 41 and the 3-4 clutch 43 for establishing the third stage are in engaged condition concurrently temporarily.

It should however be noted that both the small sun gear 31 and the carrier 35 are coupled with the turbine shaft 27 in the third stage so that the whole shift gear mechanism 30 rotates integrally. Accordingly, the double lock condition of the shift gear mechanism 30 does not occur even though the large sun gear is coupled with the turbine shaft 27 by means of the reverse clutch 44.

In this case, if the servo apply pressure is immediately supplied for establishing the second stage, which had been selected before the operation mistake to the R-range, when the shift lever is operated to the D-range again, the reverse clutch is not fully released as the forward clutch 41 and 2-4 brake are brought into engagement for establishing the second stage However, in the second stage, a driving member of the reverse clutch 44 rotates relative to a driving member of the reverse clutch 44. Thus, the shift gear mechanism 30 may produces a double lock condition so that a dragging of the reverse clutch 44 may occur.

It will be therefore understood that the double lock of the shift gear mechanism 30 can be effectively avoided by once establishing the third stage when the shift lever is operated to the D-range again.

After the predetermined time period has passed and the reverse clutch pressure has been fully discharged, the 3-4 clutch pressure and coast clutch pressure are discharged and the servo apply pressure is introduced as shown by references i and j so that the 3-4 clutch 43 and the coast clutch 42 and the 2-4 brake 45 is engaged. As a result, the shift stage is recovered to the second stage, which had been selected before the mistaken operation to the R-range.

Even if such mistaken operation to the R-range occurs in the case when the vehicle runs with other shift stages such as first, fourth and the like, the double lock condition and the dragging of the reverse clutch 44 can be effectively prevented by once establishing the third stage when a forward range is selected again.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A shift control system for an automatic transmission comprising
    a shift gear mechanism for providing a plurality of shift stages of different speed ratios,
    a plurality of frictional elements to be selectively actuated for switching a power transmitting path to establish a desired shift stage,
    range selecting means for selecting a shift range at least between a forward and a reverse ranges through a manual operation of a driver,
    control means for providing the shift gear mechanism with a specific shift stage in which an input member and output member of the shift gear mechanism are rotated together with each other in the case where the reverse range is selected during a forward movement and thereafter a forward range is selected again,
    the specific shift stage being provided for a predetermined time period after the forward range is selected again.

2. A shift control system as recited in claim 1 wherein the control means restricts engagement of one of two frictional elements which are supposed to be engaged in the reverse range when the range selecting means is operated to select the reverse range during the forward movement and thereafter provides the shift gear mechanism with the specific shift stage after the forward range is selected again.

3. A shift control system as recited in claim 2 wherein the one of the frictional element is a low reverse brake.

4. A shift control system as recited in claim 1 wherein the specific shift stage is a third stage.

5. A shift control system as recited in claim 1 wherein the specific shift stage is established by controlling a solenoid valve.

6. A shift control system as recited in claim 1 wherein after the predetermined time period, the shift stage is switched from the specific shift stage to a shift stage which had been used before the reverse range is selected during the forward movement.

7. A shift control system as recited in claim 1 wherein three frictional elements are engaged for establishing the specific shift stage to engage the input member and the output member of the shift gear mechanism.

8. A shift control system as recited in claim 1 wherein one of the two frictional elements which are supposed to be engaged in the reverse range is prevented from being engaged when the reverse range is selected during a forward movement so that the shift gear mechanism is kept at a neutral condition until a forward range is selected again.

* * * * *